US007515925B2

United States Patent
Nakagawa (10) Patent No.: US 7,515,925 B2
(45) Date of Patent: Apr. 7, 2009

(54) WIRELESS COMMUNICATION DEVICE FOR PERIODICALLY CONTROLLING A CARRIER WAVE TO ESTABLISH A GOOD COMMUNICATION STATE WITH A COMMUNICATION OBJECT

(75) Inventor: Atsushi Nakagawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 717 days.

(21) Appl. No.: 11/023,512

(22) Filed: Dec. 29, 2004

(65) Prior Publication Data

US 2005/0170793 A1 Aug. 4, 2005

(30) Foreign Application Priority Data

Feb. 3, 2004 (JP) ............................. 2004-026619

(51) Int. Cl.
*H04B 7/00* (2006.01)
(52) U.S. Cl. ............... 455/522; 455/127.1; 455/41.2; 235/472.02; 235/380; 235/492; 340/10.1; 340/572.1
(58) Field of Classification Search ............... 455/116, 455/424, 425, 456.5, 456.6, 561, 41.2, 41.1, 455/24, 13.4, 69, 343.1, 334, 522, 175.1, 455/126, 127.1; 235/492, 384, 486, 497, 235/462.28, 439, 380, 449, 441, 487, 488, 235/451, 472.02, 453, 454, 440, 375, 462.46; 375/326, 308, 320, 364, 354, 371, 340, 327, 375/329; 329/870.31, 347, 311, 397, 314; 379/111, 112, 114, 144, 357, 130–132; 340/10.1, 340/572.1, 10.2, 140.41, 10.51, 310.07, 825.34, 340/660–663, 659, 657, 572.7
See application file for complete search history.

(56) References Cited

U.S. PATENT DOCUMENTS

| 4,029,945 | A | * | 6/1977 | Yamada et al. ............... 235/488 |
| 4,795,898 | A | * | 1/1989 | Bernstein et al. ............ 235/487 |
| 4,797,541 | A | * | 1/1989 | Billings et al. .............. 235/449 |
| 4,924,171 | A | * | 5/1990 | Baba et al. .................. 323/347 |
| 4,953,123 | A | * | 8/1990 | Takeuchi et al. ............. 365/66 |
| 5,070,500 | A | * | 12/1991 | Horinouchi et al. ..... 365/189.02 |
| 5,326,965 | A | * | 7/1994 | Inoue ......................... 235/492 |
| 5,352,877 | A | * | 10/1994 | Morley ....................... 235/439 |
| 5,354,975 | A | * | 10/1994 | Ishibashi et al. ............ 235/380 |
| 5,519,729 | A | | 5/1996 | Jurisch et al. |

(Continued)

FOREIGN PATENT DOCUMENTS

| GB | 2 377 341 A | | 1/2003 |
| JP | 2001-052124 | * | 2/2001 |
| JP | 2001-250089 | * | 9/2001 |
| JP | 2002-237720 | | 8/2002 |
| JP | 2002-352198 | * | 12/2002 |
| JP | 2003-296665 | * | 10/2003 |
| WO | WO 03/025832 A1 | | 3/2003 |

OTHER PUBLICATIONS

European Search Report dated Aug. 31, 2006 for Appln. No. 04029886.1-2210.
European Search Report dated Dec. 20, 2005 for Appln. No. 04029886.1-2210.

*Primary Examiner*—Duc Nguyen
*Assistant Examiner*—Charles Chow
(74) *Attorney, Agent, or Firm*—Pillsbury Winthrop Shaw Pittman, LLP (57) ABSTRACT

A reader/writer of a wireless communication device transmits a carrier signal from an antenna, and if there is not response from an IC card within a preset time after transmitting the polling command, the carrier signal is temporarily controlled to an OFF state.

8 Claims, 6 Drawing Sheets

U.S. PATENT DOCUMENTS

| | | |
|---|---|---|
| 5,640,003 A | 6/1997 | Makino |
| 5,821,525 A * | 10/1998 | Takebayashi ................ 235/492 |
| 5,898,738 A * | 4/1999 | Nagata et al. ............... 375/326 |
| 5,905,372 A * | 5/1999 | Kuffner et al. .............. 323/356 |
| 5,929,414 A * | 7/1999 | Saitoh ........................ 235/380 |
| 6,003,777 A * | 12/1999 | Kowalski .................... 235/492 |
| 6,040,786 A | 3/2000 | Fujioka |
| 6,404,325 B1 | 6/2002 | Heinrich et al. |
| 6,472,065 B1 * | 10/2002 | Alahapperuma et al. ..... 428/343 |
| 6,595,414 B1 * | 7/2003 | Eber et al. ................... 235/380 |
| 7,003,680 B2 * | 2/2006 | Masui et al. ................. 713/300 |
| 2002/0130766 A1 | 9/2002 | Hulvey |
| 2003/0174099 A1 | 9/2003 | Bauer et al. |
| 2003/0178483 A1 * | 9/2003 | Wakabayashi .............. 235/380 |

* cited by examiner

WIRELESS COMMUNICATION DEVICE FOR PERIODICALLY CONTROLLING A CARRIER WAVE TO ESTABLISH A GOOD COMMUNICATION STATE WITH A COMMUNICATION OBJECT

CROSS-REFERENCE TO RELATED APPLICATIONS

This application is based upon and claims the benefit of priority from prior Japanese Patent Application No. 2004-026619, filed Feb. 3, 2004, the entire contents of which are incorporated herein by reference.

BACKGROUND OF THE INVENTION

1. Field of the Invention

The present invention relates to a wireless communication device that performs wireless communications between itself and an object of communication such as non-contact IC card, and carries out various types of data processing.

2. Description of the Related Art

Conventionally, an antenna device having the following structure is known as a wireless communication device. That is, two sets of antenna assembly members each having a plurality of loop antennas placed in the same plane are arranged to face each other while interposing therebetween a passage where communication objects such as wireless tags pass through. (See, for example, Jpn. Pat. Appln. KOKAI Publication No. 2002-237720 (Abstract and FIG. 1).) The characteristics of this antenna device are that some of these loop antennas are periodically switched to invert the phases and thus the non-detectible region where a wireless tag is not detected is minimized. It should be noted that the antenna device of this type is utilized as, for example, a gate for preventing shoplifting.

The conventional type of antenna device described above, however, entails the following drawbacks. That is, while an object equipped with a wireless tag passing through between a pair of antenna assembly members, if the wireless tag enters the communication ready area of the antenna device at a relatively low speed, the rise of the voltage generated inside the wireless tag becomes gentle and therefore the power-on-reset function of the wireless tag does not operate properly in some cases. In these case, the communication between the antenna device and the wireless tag is not established, and therefore the reliability of the antenna device is lowered.

Meanwhile, in the case where the phase of particular loop antennas are periodically inverted as in the above-described antenna device, the relay switch and the like need be operated for phase inversion while transmitting carrier waves for communication from the loop antennas. Thus, the switch is operated a number of times while the connection state is on, and therefore the contact point of the switch is caused to labor, thereby shortening the lifetime of the contact point.

BRIEF SUMMARY OF THE INVENTION

The object of the present invention is to provide a highly reliable wireless communication device that can establish a good communication state between the device itself and a communication object regardless of the status of the communication object.

In order to achieve the above-described object, there is provided, according to an aspect of the present invention, a wireless communication device comprising: an antenna configured to carry out a wireless communication with a communication object; a carrier wave transmitting unit configured to transmit via the antenna a carrier wave to a communication object located in a communication ready area from the antenna as a base point, the carrier wave serving to render the communication object to generate electric power for the communication; a carrier wave control unit configured to periodically control the carrier wave transmitted from the carrier wave transmitting unit in a temporary OFF manner.

According to an aspect of the present invention, there is provided a wireless communication device comprising: a plurality of antennas configured to carry out a wireless communication with a communication object; a switching unit configured to switch over the plurality of antennas; a carrier wave transmitting unit configured to transmit via the switched-over antenna a carrier wave to a communication object located in a communication ready area from the switched-over antenna as a base point, the carrier wave serving to render the communication object to generate electric power for the communication; a carrier wave control unit configured to periodically control the carrier wave transmitted from the carrier wave transmitting unit in a temporary OFF manner.

With the above-described inventions, the carrier wave used to make a communication object to generate an electric power is periodically controlled in a temporary off manner. By this way, if the establishment of a connection between the device and communication object results in failure, the power-on-reset function of the communication object can be properly operated.

According to another aspect of the present invention, there is provided a wireless communication device comprising: an antenna configured to carry out a wireless communication with a communication object; a carrier wave transmitting unit configured to transmit via the antenna a carrier wave to a communication object located in a communication ready area from the antenna as a base point, the carrier wave having a level exceeding a threshold level that can render the communication object to generate electric power for the communication; and a carrier wave control unit configured to periodically set the level of the carrier wave transmitted from the carrier wave transmitting unit temporarily lower than the threshold level.

With the above-described invention, the carrier wave used to make a communication object to generate an electric power is periodically set to a level lower than the threshold temporarily. By this way, if the establishment of a connection between the device and communication object results in failure, the power-on-reset function of the communication object can be properly operated.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will now be described in detail with reference to accompanying drawings.

Figure 1:
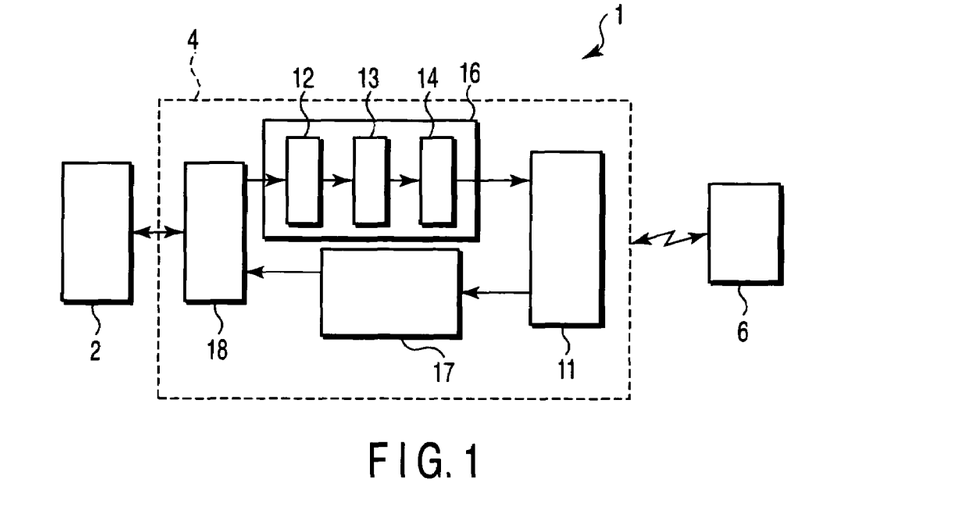
FIG. 1 is a block diagram showing a brief structure of a wireless communication device according to the first embodiment of the present invention.

FIG. 1 is a block diagram schematically showing a structure of a wireless communication device 1 according to the first embodiment of the present invention. As shown in the figure, the wireless communication device 1 includes a host device 2 and a reader/writer 4 that are connected to each other via wire or wirelessly. The feature of this embodiment is that the reader/writer 4 has a single antenna 11.

The host device 2 of the wireless communication device 1 transmits various types of command data regarding signal transmission to the reader/writer 4, and receives a response result from a non-contact IC card 6 (to be referred to simply as IC card 6 hereinafter), that is, a communication object, via the reader/writer 4.

The reader/writer 4 includes a single antenna 11 designed to carry out wireless communication between the device and the IC card 6 located within the communication ready area. Further, the reader/writer 4 includes a signal transmission circuit 16 that functions as a carrier wave transmitting unit and command signal transmitting unit of the present invention, a signal receiving circuit 17 that functions as a signal receiving unit of the present invention and a control circuit 18 that functions as a carrier wave control unit of the present invention. The signal transmitting circuit 16 includes a carrier signal transmitting circuit 12, a modulation circuit 13 and a signal transmitting driver 14.

The carrier signal transmitting circuit 12 of the signal transmitting circuit 16 serves to transmit a carrier signal (carrier wave) for making the LSI (not shown) equipped in the IC card 6 to generate electric power. The modulation circuit 13 serves to modulate the carrier signal based on command data transmitted from the host device 2 via the control circuit 18.

Then, the signal transmitting driver 14 serves to transmit the carrier signal that carries the command data as described above, via the antenna 11. It should be noted that the carrier signal transmitting circuit 12 transmits the carrier signal or stops the transmission of the signal in accordance with a command of transmission of a carrier signal or of stopping the transmission, supplied from the control circuit 18.

The signal receiving circuit 17 serves to receive via the antenna 11 a response signal transmitted back from an IC card 6 that has responded to the carrier signal, demodulate the response signal and transfer the demodulated signal as a response result to the control circuit 18. Then, the control circuit 18 transfer data regarding the demodulated response result back to the host device 2. It should be noted that the control circuit 18 transmit a command for periodically set the carrier signal outputted from the carrier signal transmitting circuit 12 temporarily in an OFF state.

Figure 2:
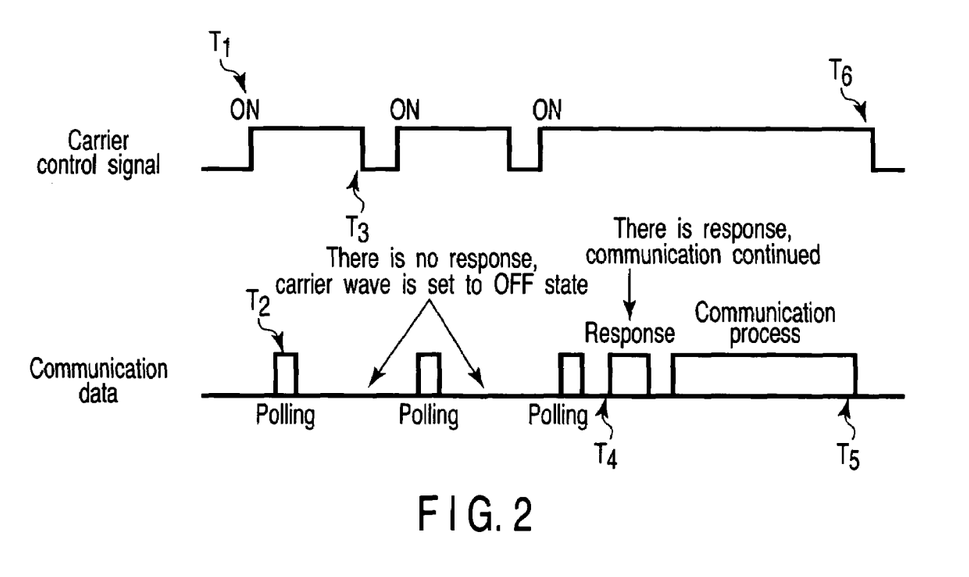
FIG. 2 is a timing chart that indicates the timing of the temporary OFF operation of: the carrier signal in the device shown in FIG. 1.
Figure 3:
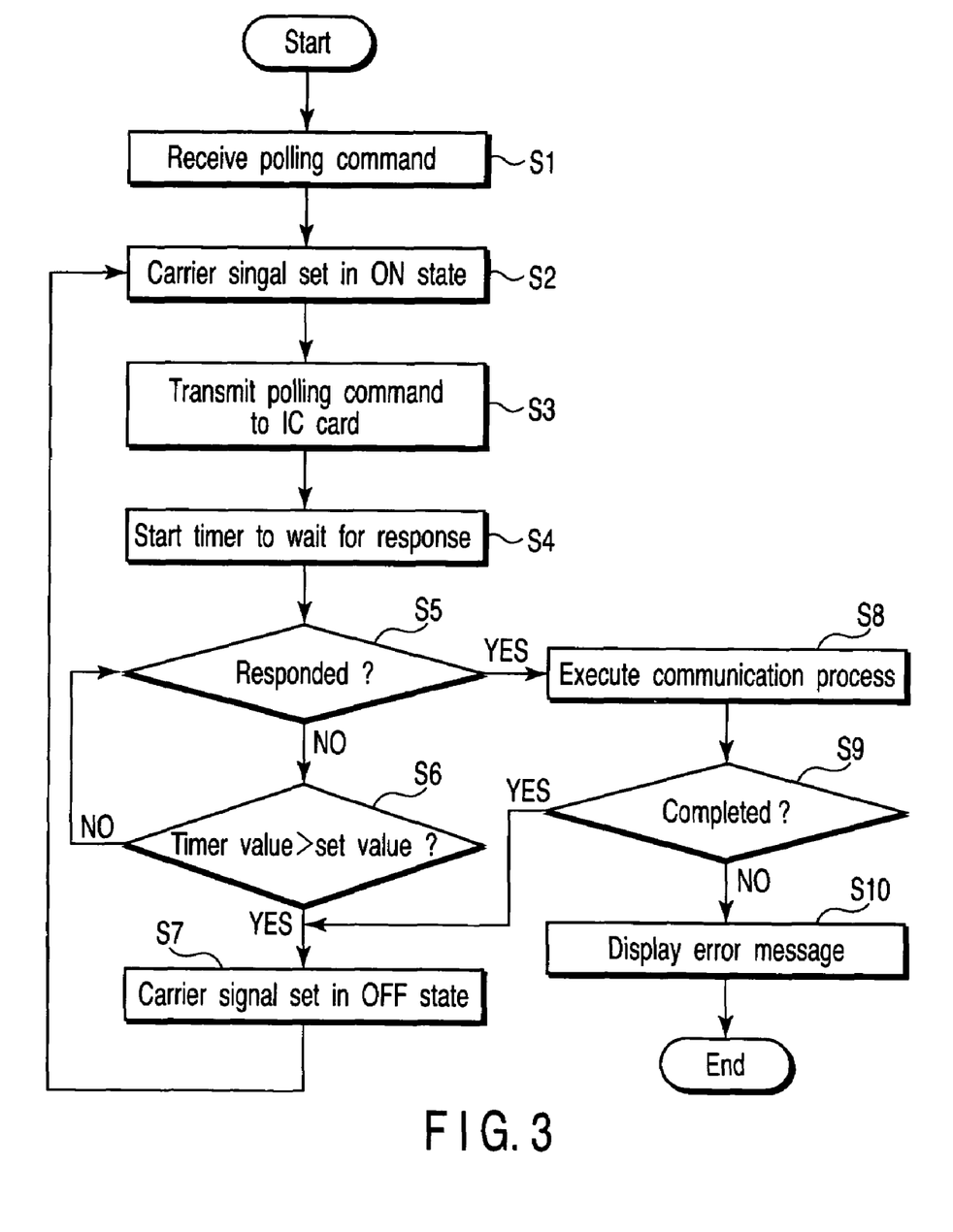
FIG. 3 is a flowchart for explain the temporary OFF operation of the carrier signal together with FIG. 2.

The operation of the wireless communication device 1 that has the above-described structure will now be described with reference to FIGS. 2 and 3. FIG. 2 is a timing chart that indicates the timing of the temporary OFF control of the above-described control circuit 18 on the carrier signal. Further, FIG. 3 shows a flowchart designed to describe the temporary OFF operation of the carrier signal, carried out by the control circuit 18.

As shown, when a polling command outputted from the host device 2 is received by the reader/writer 4 (Step 1 in FIG. 3), the control circuit 18 sets the carrier control signal to be transmitted to the transmitting circuit 16 to an ON state (Step 2), and makes the transmitting circuit 16 to output the carrier signal that carries the command data from the host device 2 (Timing 1 in FIG. 2).

In the meantime, after waiting for the time period defined by the IC card 6, which is taken from the reception of the carrier signal to the time when the polling command becomes acceptable, the control circuit 18 outputs a polling command (Timing 2, Step 3). This polling command is outputted via the antenna 11 as it is carried on a carrier signal.

Then, the control circuit 18 sets a timer (not shown) to wait for a response from an IC card 6 located in a communication ready area created by the antenna 11 as the base point (Step 4), and waits for a preset time (Steps 5 and 6). Here, under a condition where the signal receiving circuit 17 does not receive the response signal from any IC card 6 within the preset time period (that is, NO in Step 5 and YES in Step 6), the control circuit 18 controls the transmitting circuit 16 to temporarily set the carrier signal only for a very short period of time to an OFF state (Timing 3, Step 7).

On the other hand, under a condition where the signal receiving circuit 17 receives the response signal from an IC card 6 within the preset time period after outputting the polling command (that is, Timing 4 and YES in Step 5), the control circuit 18 executes the communication process from that step onwards without temporarily setting the carrier signal to the OFF state (Step 8). Then, after the communication process is properly completed (Timing 5, YES in Step 9), the control circuit 18 sets the carrier signal to the OFF state (Timing 6, Step 7). If the communication process is not properly completed (NO in Step 9), the control circuit 18 displays an error message via a display unit that is not shown in the figure (Step 10).

Then, the control circuit 18 sets the carrier signal to the OFF state in the process of the abovementioned Step 7, and waits only for a very short period of time. After that, the operation of the control circuit 18 returns to the process of Step 2, where the carrier signal is once again outputted, and the processing steps described above that are carried out onto the other IC card 6 from this step onwards are repeated.

As described above, the wireless communication device 1 according to this embodiment operates in the following manner. That is, if a response from an IC card 6 to a polling command from the reader/writer 4 results in failure for some reason, the carrier signal is controlled to be temporarily in an OFF state at the above-described timing. Therefore, if the IC card 6 fails to response to the polling command, the sharp rise of the voltage for generating electric power in the LSI of the IC card 6 can be established, thereby making possible to have the IC card 6 power-on reset without fail. Consequently, it is possible to establish a good communication state between the reader/writer 4 and the IC card 6.

Figure 4:
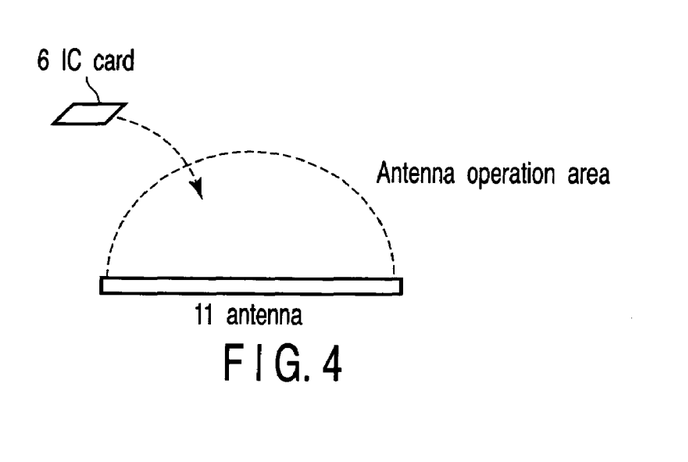
FIG. 4 is a diagram showing a state in which an IC card enters a communication ready area created by the antenna of the device shown in FIG. 1, serving as the base point.
Figure 5:
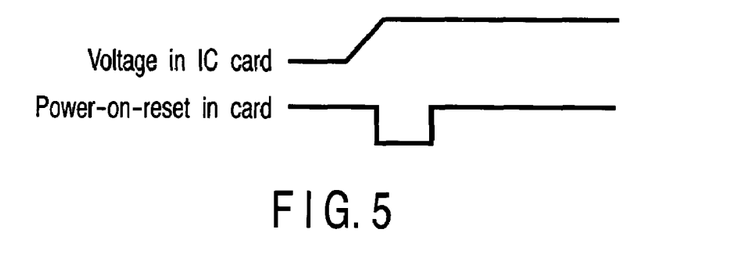
FIG. 5 is a timing chart that indicates the relationship between the change in the voltage generated in the IC card and the power-on-reset signal when the IC card is made to enter the communication ready area at a relatively high speed in the state shown in FIG. 4.
Figure 6:
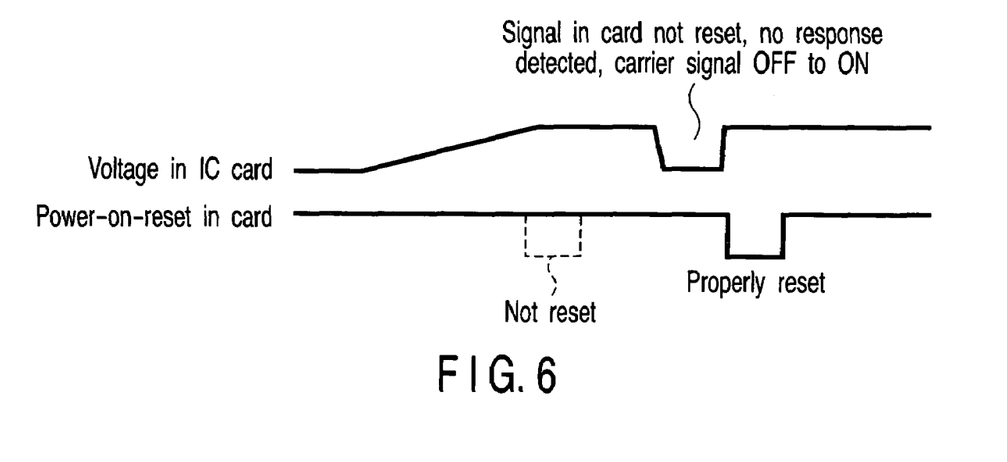
FIG. 6 is a timing chart that indicates the relationship between the change in the voltage generated in the IC card and the power-on-reset signal when the IC card is made to enter the communication ready area at a relatively high speed in the case where the present invention is applied.

In other words, while an IC card 6 passing through a communication ready area created by the antenna 11 of the reader/writer 4, which serves as the base point as shown in FIG. 4, if the IC card 6 is made to enter the area at a normal speed, the rise of the voltage generated in the LSI of the IC card 6 becomes sharp as shown in FIG. 5 and therefore the power-on-reset function of the IC card can operate properly. In contrast, if the IC card 6 is made to enter the area at a relative low speed, the rise of the voltage generated in the LSI becomes gentle as shown in FIG. 6 and therefore the power-on-reset function of the IC card 6 cannot operate properly in some cases. In these cases, such a state that the IC card 6 fails to make a response is created, and consequently, the connection is not established. However, by controlling the carrier signal in a temporary OFF manner periodically as in the above-described embodiment, the rise of the voltage in the LSI can be made sharp, thereby enabling the power-on-reset function to operate properly. Thus, a good communication state can be established between the IC card 6 and the reader/writer 4.

Figure 7:
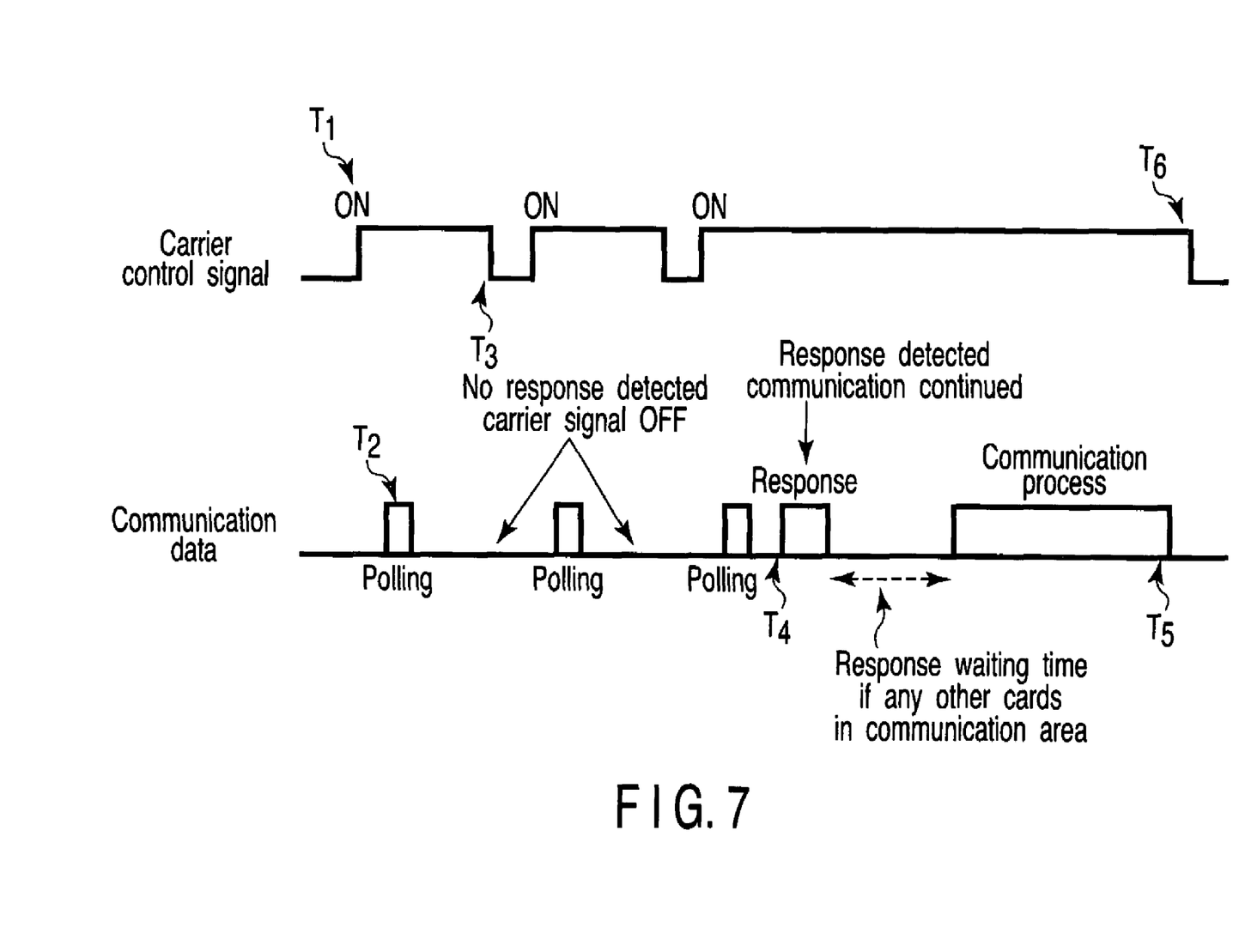
FIG. 7 is a timing chart that indicates the timing of the temporary OFF operation of the carrier signal in the case where a plurality of IC cards are processed by the device shown in FIG. 1.
Figure 8:
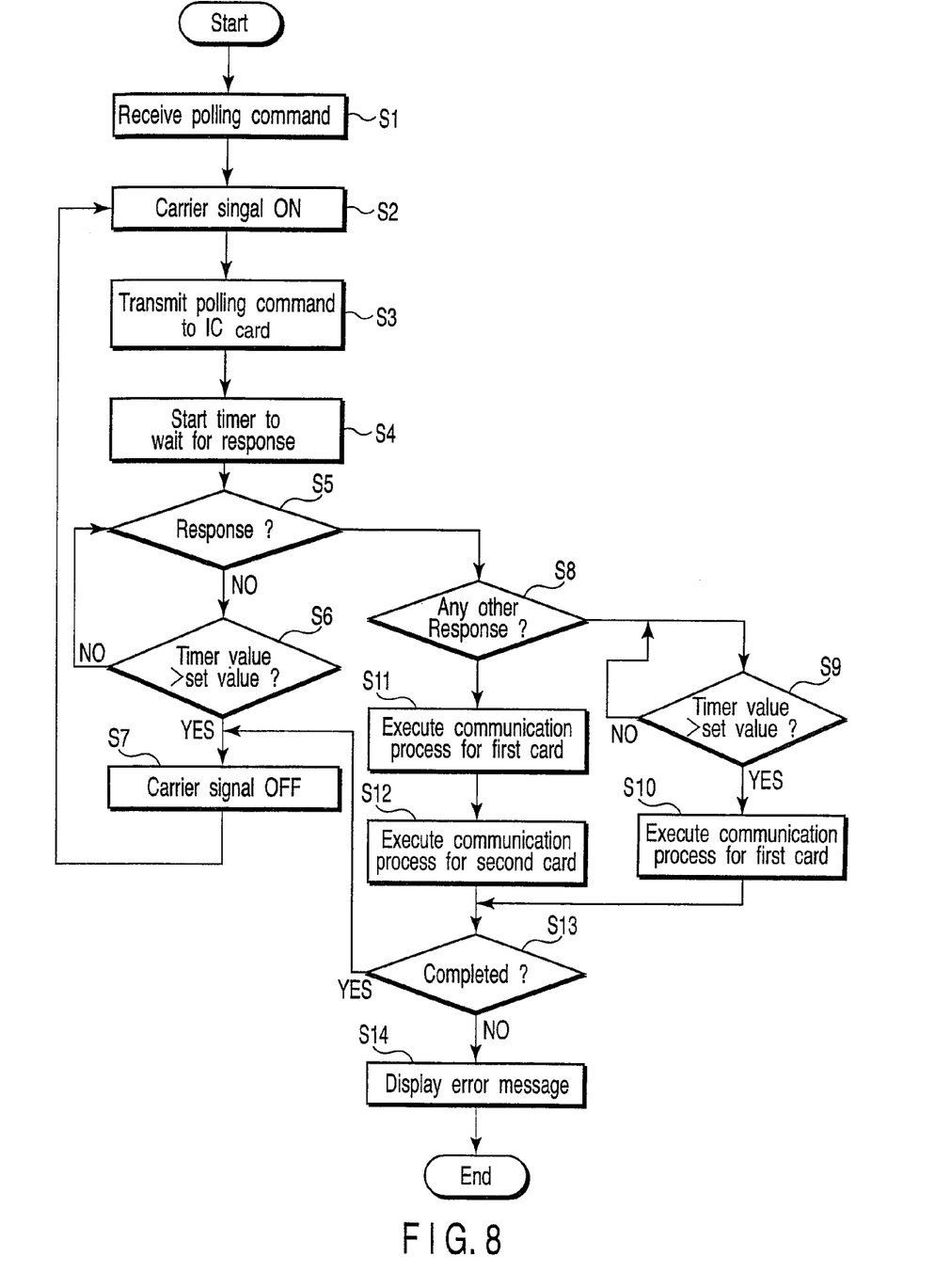
FIG. 8 is a flowchart for explain the temporary OFF operation of the carrier signal together with FIG. 7.

Next, a remodeled version of the first embodiment provided above will now be described with reference to FIGS. 7 and 8 together with FIG. 1. FIG. 7 is a timing chart that indicates the timing of the temporary OFF operation of the carrier signal in the case where a plurality of IC cards 6 are processed at the same time. Further, FIG. 8 is a timing chart that indicates the timing of the temporary OFF operation of the carrier signal in the case shown in FIG. 7. In other words, the operation of the wireless communication device 1 shown in FIG. 1 where a plurality of IC cards 6 are processed at the same time will now be described.

As shown, when a polling command outputted from the host device 2 is received (Step 1 in FIG. 8), the control circuit 18 sets the carrier control signal to an ON state (Step 2), and makes the transmitting circuit 16 to output the carrier signal that carries the command data from the host device 2 (Timing 1 in FIG. 7). Then, the polling command is outputted via the antenna 11 (Timing 2, Step 3).

Then, the control circuit 18 sets a timer (Step 4) and waits for a response from an IC card 6 for a preset time (Steps 5 and 6). Here, in the case where the response signal from the IC card 6 is not received within the preset time period (that is, NO in Step 5 and YES in Step 6), the carrier signal is temporarily set to the OFF state only for a very short period of time (Timing 3, Step 7).

On the other hand, in the case where the response signal is received from the IC card 6 within the preset time period (that is, Timing 4 and YES in Step 5), the control circuit 18 waits for a response from some other IC card 6 only for a predetermined waiting time (Steps 8 and 9). In the case where the response signal from the other IC card 6 is not received within the preset time period (that is, NO in Step 8 and YES in Step 9), the communication process for the first IC card 6 is executed (Step 10).

In the case where the response signal from the other IC card 6 is received within the preset time period (that is, YES in Step 8), the control circuit 18 executes the communication process for the first IC card 6 (Step 11), and after that, executes the communication process for the second IC card 6 (Step 12).

Then, after the communication process is properly completed for each one of the IC cards 6 located in a communication ready area of the antenna 11 (Timing 5, YES in Step 13), the control circuit 18 sets the carrier signal to an OFF state (Timing 6, Step 7). If the communication process is not properly completed for at least one of the IC cards 6 located within the communication ready area (NO in Step 13), the control circuit 18 displays an error message via a display unit that is not shown in the figure (Step 14).

Then, the control circuit 18 sets the carrier signal to the OFF state in the process of the above-mentioned Step 7, and waits only for a present very short period of time. After that, the operation of the control circuit 18 returns to the process of Step 2, where the carrier signal is once again outputted, and the processing steps described above that are carried out onto the another IC card 6 from this step onwards are repeated.

As described above, according to the remodeled version of the embodiment, if a plurality of IC cards 6 enter the communication ready area of the antenna 11 of the wireless communication device 1, the communication process can be properly carried out for all of the IC cards 6.

Next, a wireless communication device 20 according to the second embodiment of the present invention will now be described with reference to FIGS. 9 and 10. The wireless communication device 20 is characterized by including a plurality of antennas. It should be noted that those structural elements whose functions are similar to those of the wireless communication device 1 of the first embodiment described above will be designated by the same reference numerals respectively and the descriptions for the detailed structures and functions thereof will not be repeated.

Figure 9:
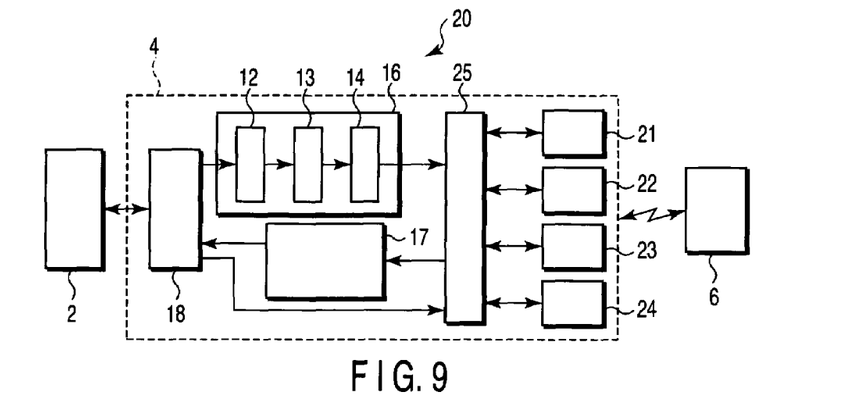
FIG. 9 is a block diagram showing a brief structure of a wireless communication device according to the second embodiment of the present invention.

As can be seen in FIG. 9, the wireless communication device 20 of this embodiment is different from the wireless communication device 1 of the first embodiment described above in the respect that a reader/writer 4 includes four antennas 21, 22, 23 and 24 for wirelessly communicating with an IC card 6, and a switching unit 25 that serves to switch over these four antennas. Further, the switching unit 25 includes a plurality of reply switches, though not shown in the figure, which correspond to the antennas 21 to 24, respectively. The switching unit 25 is connected to the control circuit 18 and these relay switches are switched over in accordance with the command supplied from the control circuit 18.

Figure 10:
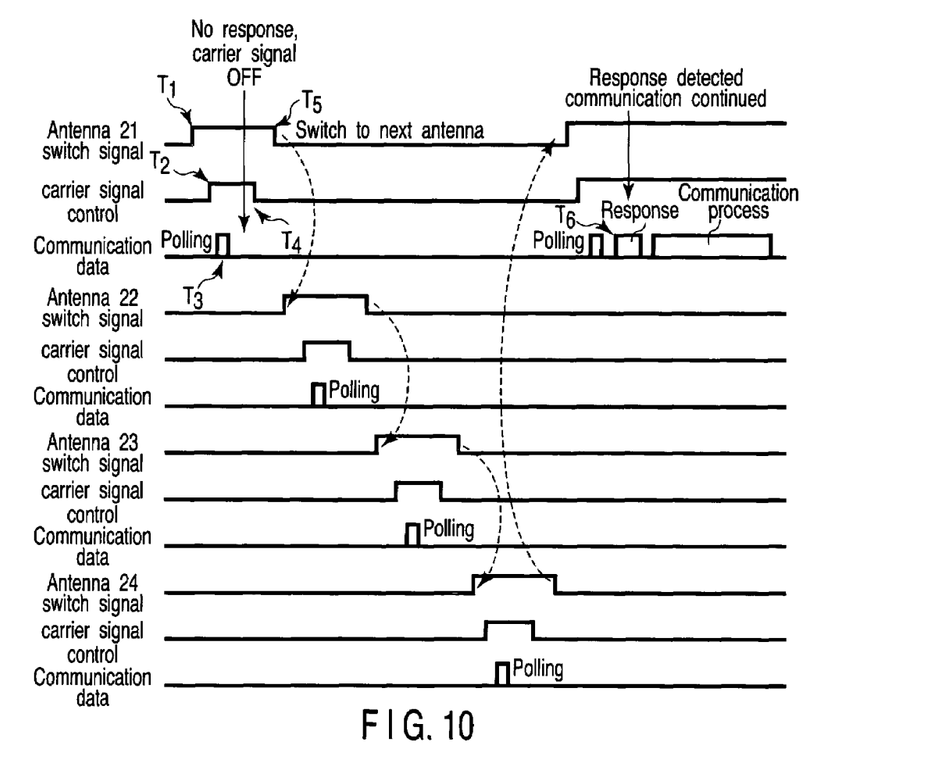
FIG. 10 is a timing chart that indicates the relationship between the timing for switching the antenna and the timing of the temporary OFF operation of the carrier signal in the device shown in FIG. 9.

With the above-described structure, when the reader/writer 4 receives a polling command from the host device 2, the control circuit 18 selects, for example, the antenna 21 and sets the switch signal of the corresponding relay switch to the ON state (Timing T1 in FIG. 10). Subsequently, the control circuit 18 controls the signal transmitting circuit 16 to output a carrier signal via the selected antenna 21 (Timing T2).

After that, the control circuit 18 controls the signal transmitting circuit 16 to transmit a polling command via the antenna 21 (Timing T3) and sets the timer to wait for a response from an IC card 6. In the case where there is no response from an IC card 6 within the preset time-out period, the control circuit 18 controls the transmitting circuit 16 to deactivate the carrier signal (Timing T4), and then control the switching unit 25 to switch the relay switch to change the antenna 21 to the antenna 22 (Timing T5).

Subsequently, in a similar manner to the above, the control circuit 18 outputs a carrier signal that carries a polling command via the next antenna 22. In the case where there is no response to the polling command received from an IC card 6, the antenna is further switched to the next one, antenna 23. In this manner, the control circuit 18 repeats the above-described switching operation until a response is received from an IC card 6 (Timing T6). Then, in the case where there is a response from an IC card 6, the control circuit 18 executes the communication process without setting the carrier signal to the OFF state or switching the antenna to another. It should be noted that the example shown in FIG. 10 illustrates the case where a response is received from an IC card 6 when the antenna 21 is switched over to antenna 22, 23 and 24 and then further switched back to the antenna 21.

As described above, according to this embodiment, each time the antenna is switched to another, the carrier signal can be controlled in a temporary OFF manner. With this structure, as in the case of the first embodiment described above, even if an IC card 6 once fails to make a response, the power-on-reset function can be properly operated, thereby making it possible to establish a good communication state.

Further, according to this embodiment, the antennas are switched over while the connection state of the relay switches of the switching unit 25 is released. In this manner, it is possible to prevent the load from being applied to the contact point of each relay switch, and therefore the lifetime of the relay switch can be prolonged. Consequently, a highly reliable communication process can be performed.

It should be noted here that the present invention is not limited to the above-described embodiments as they are, but it can be further embodied by remodeling the structural elements as long as the essence of the invention remains its scope. Further, various types of inventions can be created by appropriately combining some of the structural elements disclosed in each of the embodiments described above. For example, some of the structural elements can be withdrawn from the entire structure presented in each of the above-described embodiments to achieve the invention. Furthermore, structural elements of different embodiments may be combined appropriately.

For example, the above-described embodiments are described in connection with the case where non-contact IC cards 6 are applied as communication objects; however the present invention is not limited to the case, but it can be applied to communications with some other object such as wireless tag.

In addition, in the embodiments described above, the control circuit 18 of the reader/writer 4 controls the carrier signal to be temporarily set to the OFF state and then back to the ON state periodically at a predetermined timing. In this manner, if the establishment of the communication with an IC card 6 results in failure, the power-on-reset function can be properly operated. However, the present invention is not limited to this operation, but it is alternatively possible to temporarily lower the carrier signal to a certain level periodically. In this case, the certain level indicates such a level lower than the threshold of the carrier signal where it is possible to make an IC card 6 to generate the electric power for communication.

What is claimed is:

1. A wireless communication device comprising:
   an antenna configured to carry out a wireless communication with a communication object;
   a carrier wave transmitting unit configured to transmit via the antenna a carrier wave to the communication object located in a communication ready area from the antenna as a base point, the carrier wave having a level exceeding a threshold level that can render the communication object to generate electric power for the communication;
   a carrier wave control unit configured to periodically set the level of the carrier wave transmitted from the carrier wave transmitting unit temporarily lower than the threshold level; and
   a signal receiving unit configured to receive via the antenna a response signal transmitted in reply to the carrier wave from the communication object in the communication ready area,
   wherein the carrier wave control unit temporarily sets the carrier wave to a level lower than the threshold level when the signal receiving unit does not receive the response signal within a certain period of time after the carrier wave transmitting unit transmits the carrier wave.

2. A wireless communication device comprising:
   an antenna configured to carry out a wireless communication with a communication object;
   a carrier wave transmitting unit configured to transmit via the antenna a carrier wave to the communication object located in a communication ready area from the antenna as a base point, the carrier wave having a level exceeding a threshold level that can render the communication object to generate electric power for the communication;
   a carrier wave control unit configured to periodically set the level of the carrier wave transmitted from the carrier wave transmitting unit temporarily lower than the threshold level; and
   a command transmitting unit configured to transmit command data to the communication object,
   wherein the carrier wave control unit temporarily sets the carrier wave to a level lower than the threshold level each time a polling command is transmitted from the command transmitting unit.

3. A wireless communication device comprising:
   an antenna configured to carry out a wireless communication with a communication object;
   a carrier wave transmitting unit configured to transmit via the antenna a carrier wave to the communication object located in a communication ready area from the antenna as a base point, the carrier wave having a level exceeding a threshold level that can render the communication object to generate electric power for the communication;
   a carrier wave control unit configured to periodically set the level of the carrier wave transmitted from the carrier wave transmitting unit temporarily lower than the threshold level;
   a command transmitting unit configured to transmit command data to the communication object while carrying the command data on the carrier wave; and
   a signal receiving unit configured to receive via the antenna a response signal transmitted in reply to the carrier wave from the communication object in the communication ready area,
   wherein the carrier wave control unit temporarily sets the carrier wave to a level lower than the threshold level when the signal receiving unit does not receive the response signal within a certain period of time after the command transmitting unit transmits the polling command carried on the carrier wave.

4. A wireless communication device comprising:
   an antenna configured to carry out a wireless communication with a communication object;
   a carrier wave transmitting unit configured to transmit via the antenna a carrier wave to the communication object located in a communication ready area from the antenna as a base point, the carrier wave having a level exceeding a threshold level that can render the communication object to generate electric power for the communication;

a carrier wave control unit configured to periodically set the level of the carrier wave transmitted from the carrier wave transmitting unit temporarily lower than the threshold level;

at least one antenna identical to the antenna; and a switching unit configured to switch over between the plurality of antennas;

wherein the carrier wave control unit periodically sets the carrier wave transmitted from the carrier wave transmitting unit temporarily to a level lower than the threshold level via the antenna switched over by the switching unit.

5. The wireless communication device according to claim 4, wherein the carrier wave control unit temporarily sets the carrier wave to a level lower than the threshold level each time the switching unit switches the plurality of antennas over between them.

6. The wireless communication device according to claim 4, further comprising: a signal receiving unit configured to receive a response signal transmitted in reply to the carrier wave from the communication object in the communication ready area created from the antenna switched over by the switching unit via the switched antenna, wherein the carrier wave control unit temporarily sets the carrier wave to a level lower than the threshold level when the signal receiving unit does not receive the response signal within a certain period of time after the carrier wave transmitting unit transmits the carrier wave via the switched antenna.

7. The wireless communication device according to claim 4, further comprising: a command transmitting unit configured to transmit command data to the communication object while carrying the command data on the carrier wave, wherein the carrier wave control unit temporarily sets the carrier wave transmitted from the carrier wave transmitting unit to a level lower than the threshold level each time a polling command is transmitted from the command transmitting unit.

8. The wireless communication device according to claim 4, further comprising:

a command transmitting unit configured to transmit command data to the communication object while carrying the command data on the carrier wave; and a signal receiving unit configured to receive a response signal transmitted in reply to the carrier wave from the communication object in the communication ready area created from the antenna switched over by the switching unit via the switched antenna, wherein the carrier wave control unit temporarily sets the carrier wave to a level lower than the threshold level when the signal receiving unit does not receive the response signal within a certain period of time after the command transmitting unit transmits the polling command carried on the carrier wave via the switched antenna.

* * * * *